United States Patent
Yuan (10) Patent No.: US 12,416,321 B2
(45) Date of Patent: Sep. 16, 2025

(54) PROGNOSTICATION AND AMELIORATION OF GAS INGRESS IN HYDRAULIC SYSTEMS

(71) Applicant: THE BOEING COMPANY, Chicago, IL (US)

(72) Inventor: Jun Yuan, Sammamish, WA (US)

(73) Assignee: The Boeing Company, Arlington, VA (US)

( * ) Notice: Subject to any disclaimer, the term of this patent is extended or adjusted under 35 U.S.C. 154(b) by 934 days.

(21) Appl. No.: 17/539,887

(22) Filed: Dec. 1, 2021

(65) Prior Publication Data

US 2023/0167836 A1    Jun. 1, 2023

(51) Int. Cl.
F15B 21/044    (2019.01)
B64D 43/00    (2006.01)
G06F 17/12    (2006.01)
B64D 45/00    (2006.01)

(52) U.S. Cl.
CPC ............ *F15B 21/044* (2013.01); *B64D 43/00* (2013.01); *G06F 17/12* (2013.01); *B64D 2045/0085* (2013.01); *F15B 2211/857* (2013.01)

(58) Field of Classification Search
CPC ........ F15B 21/044; F15B 21/04; F15B 21/00; F15B 2211/857; F15B 2201/205; F15B 2201/505; B64D 43/00; B64D 2045/0085; B64D 45/00; G06F 17/12; G06F 17/11; G06F 17/10; G06F 17/00
See application file for complete search history.

(56) References Cited

U.S. PATENT DOCUMENTS

| | | | | |
|---|---|---|---|---|
| 4,305,284 A * | 12/1981 | Rybicki | ................... | G01F 23/14 73/302 |
| 2010/0030496 A1* | 2/2010 | Vianna | ................... | F15B 20/005 702/114 |
| 2014/0224007 A1* | 8/2014 | Horabin | ................ | G01F 23/804 73/168 |
| 2017/0184138 A1* | 6/2017 | Smith | ..................... | G01F 23/00 |

* cited by examiner

*Primary Examiner* — Mohamed Charioui
(74) *Attorney, Agent, or Firm* — Harrity & Harrity, LLP (57) ABSTRACT

Prognostication and amelioration of gas ingress in hydraulic systems can be provided by identifying a stable reading window when operating a carrying system comprising a hydraulic system; collecting a set of fluid level readings of a hydraulic fluid in the hydraulic system during a plurality of stable reading windows across a corresponding plurality of operational instances of the carrying system; calculating median fluid levels in each stable reading window of the plurality of stable reading windows; identifying an increasing trend in the median fluid levels when analyzed as time series data that satisfies a trend threshold of at least a predefined number successive indications of increased fluid levels in the hydraulic fluid within an analysis window; and generating an alert of gas ingress to the hydraulic system.

20 Claims, 7 Drawing Sheets

PROGNOSTICATION AND AMELIORATION OF GAS INGRESS IN HYDRAULIC SYSTEMS

INTRODUCTION

Field

Aspects of the present disclosure relate to data-driven approaches for the prognostication and amelioration of gas ingress in hydraulic systems, such as those found in aircraft for the control of landing gear and various control surfaces. The approaches described herein can provide one or more of increased safety, lower component wear, easier maintenance, greater measurement accuracy, earlier fault detection, and faster computational speeds compared to other approaches.

BACKGROUND

A hydraulic accumulator is a tank (often spherical and made of steel) that is divided into two chambers by a diaphragm, balloon, or piston. One of the chambers contains hydraulic fluid at system pressure, while the other is charged with a gas (e.g., air or nitrogen ($N_2$)). This gas acts as a spring; pressing on the incompressible hydraulic fluid via gas pressure. The gas allows the hydraulic accumulator to act as a pressure storage reservoir to act as a shock absorber for the hydraulic system and to temporarily respond more quickly to changes in pressure demands when using a less powerful hydraulic pump, among other benefits. Over time, the gas in the second chamber may potentially leak into the first chamber, which is known as a gas ingress. Gas ingress may cause the hydraulic system to stop working properly, and can cause additional wear on the hydraulic components and associated components of a vehicle or other carrying system employing a hydraulic accumulator.

SUMMARY

Certain aspects provide a method, comprising: identifying a stable reading window when operating a carrying system comprising a hydraulic system; collecting a set of fluid level readings of a hydraulic fluid in the hydraulic system during a plurality of stable reading windows across a corresponding plurality of operational instances of the carrying system; calculating median fluid levels in each stable reading window of the plurality of stable reading windows; identifying an increasing trend in the median fluid levels when analyzed as time series data that satisfies a trend threshold of at least a predefined number successive indications of increased fluid levels in the hydraulic fluid within an analysis window; and generating an alert of gas ingress to the hydraulic system.

Certain aspects provide a system, comprising: a processor; and a memory, including instructions that when executed by the processor perform operations comprising: identifying a stable reading window when operating a carrying system comprising a hydraulic system; collecting a set of fluid level readings of a hydraulic fluid in the hydraulic system during a plurality of stable reading windows across a corresponding plurality of operational instances of the carrying system; calculating median fluid levels in each stable reading window of the plurality of stable reading windows; identifying an increasing trend in the median fluid levels when analyzed as time series data that satisfies a trend threshold of at least a predefined number successive indications of increased fluid levels in the hydraulic fluid within an analysis window; and generating an alert of gas ingress to the hydraulic system.

Certain aspects provide a memory device including instructions that when executed by a processor perform operations comprising: identifying a stable reading window when operating a carrying system comprising a hydraulic system; collecting a set of fluid level readings of a hydraulic fluid in the hydraulic system during a plurality of stable reading windows across a corresponding plurality of operational instances of the carrying system; calculating median fluid levels in each stable reading window of the plurality of stable reading windows; identifying an increasing trend in the median fluid levels when analyzed as time series data that satisfies a trend threshold of at least a predefined number successive indications of increased fluid levels in the hydraulic fluid within an analysis window; and generating an alert of gas ingress to the hydraulic system Some aspects further comprise: calculating standard deviations in the set of fluid level readings for each stable reading window of the plurality of stable reading windows; fitting a regression model to the median fluid levels as the time series data; calculating a mean square error for the standard deviations; and excluding a given instance of the median fluid levels when analyzing the time series data when the mean square error associated with the given instance is above an outlier threshold.

In some aspects: the carrying system is an aircraft; the stable reading window occurs a first threshold number of minutes before a middle of cruise time and the first threshold number of minutes after the middle of cruise time; and the middle of cruise time occurs at least a second threshold number of minutes after reaching a top of climb and at least the second threshold number of minutes before reaching a top of descent during a given operational instance of the carrying system.

Some aspects further comprise: identifying a given operational instance of the plurality of operational instances in which sensors in the carrying system unrelated to the hydraulic system indicate an operational aberration; excluding a given instance of the median fluid levels associated with the given operational instance when analyzing the time series data; and bifurcating the time series data to represent operational instances before the operational aberration and operational instances after the operational aberration.

In some aspects, analyzing the median fluid levels as the time series data further comprises: identifying a set of successive operational instances from the plurality of operational instances; clustering, via an unsupervised machine learning technique, the set of successive operational instances into a first cluster and a second cluster based on associated median fluid levels associated with the set of successive operational instances and associated operational times associated with the set of successive operational instances; determining a distance between a first centroid value for the first cluster and a second centroid value for the second cluster based on the associated median fluid levels; and excluding a latest operational instance of the set of successive operation instances from analysis in response to at least one of: a first sum of squared distances, between the first centroid value and each member of the first cluster exceeding, a sum squared error threshold; a second sum of squared distances, between the second centroid value and each member of the second cluster, exceeding the sum squared error threshold; and the distance between the first centroid value and the second centroid value exceeds a service specification indicative of the hydraulic fluid being serviced within the set of successive operation instances.

In some aspects, generating the alert of gas ingress to the hydraulic system further comprises: identifying that the increasing trend holds true for a majority of the predefined number successive indications of the increased fluid levels in the hydraulic fluid.

In some aspects, generating the alert of gas ingress to the hydraulic system further comprises: identifying that the increased fluid levels in the hydraulic fluid comprise at least a threshold amount over a nominal fill level for the hydraulic fluid.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable media for predicting, detecting, and addressing gas ingress in hydraulic systems. Although the present disclosure primarily provides examples related to hydraulic systems installed on aircraft, the present disclosure is also envisioned for use with hydraulic systems installed on various carrying systems including: watercraft (including submersibles), spacecraft, dirigibles, automobiles, trains, and land-based systems included in vehicles or structures (e.g., dam locks).

Additionally, although the examples given herein primarily relate to gas charged accumulators that use a compressed gas and a diaphragm to act like a spring on the hydraulic fluid, carrying systems that use other types of accumulators may also make use to the present disclosure (e.g., bladder types, piston types, bellows types, etc.).

The hydraulic systems and the carrying systems described herein may include various built-in sensors (or be periodically measured by external sensors) to provide data about the operation of the respective systems. One data set provided about the hydraulic systems is the hydraulic fluid level. Although generally, the hydraulic fluid level is expected to decrease over time (e.g., due to micro-leaks), because hydraulic systems operate via applied static pressures, and may be subjected to various external forces and pressures, the hydraulic fluid level readings may occasionally spike or dip as pumps activate and deactivate or loads are applied or removed. Additionally, gas ingress is expected to artificially increase the hydraulic fluid level readings as bubbles or pockets of gas entering the hydraulic fluid chamber displace the hydraulic fluid.

The approaches described in the present disclosure therefore use data for the operational state of the carrying system to identify a stable window in which the hydraulic fluid level readings are accurate, and identify comparable windows across use times to develop a time series of data points to compare for trends in the hydraulic fluid level. These trend data are analyzed to identify when the hydraulic fluid level appears to be artificially increasing due to gas ingress (rather than actually increasing due to refilling a hydraulic fluid reservoir) to alert an operator of the carrying system to perform maintenance on the hydraulic system or take other ameliorative action.

Example Operational Considerations

FIGS. 1A-1D illustrate a diaphragm-type hydraulic accumulator 110 in a cross-sectional view in various stages of operation, according to aspects of the present disclosure. In each of FIGS. 1A-1D, the hydraulic accumulator is shown with a diaphragm 112 separating a first chamber 114 from a second chamber 116. The first chamber 114 is nominally filled with a compressible gas (e.g., air, $N_2$) received at a known pressure from a pressure tank 120. Each of the illustrated views in FIGS. 1A-1D illustrate the first chamber 114 filled at nominally the same volume of gas from the pressure tank 120, but with the diaphragm 112 at different positions due to different levels of hydraulic fluid being held in the second chamber 116 and the supply line 130 that connects the hydraulic accumulator to the control and actuation surfaces 140 of the hydraulic system.

Figure 1A:
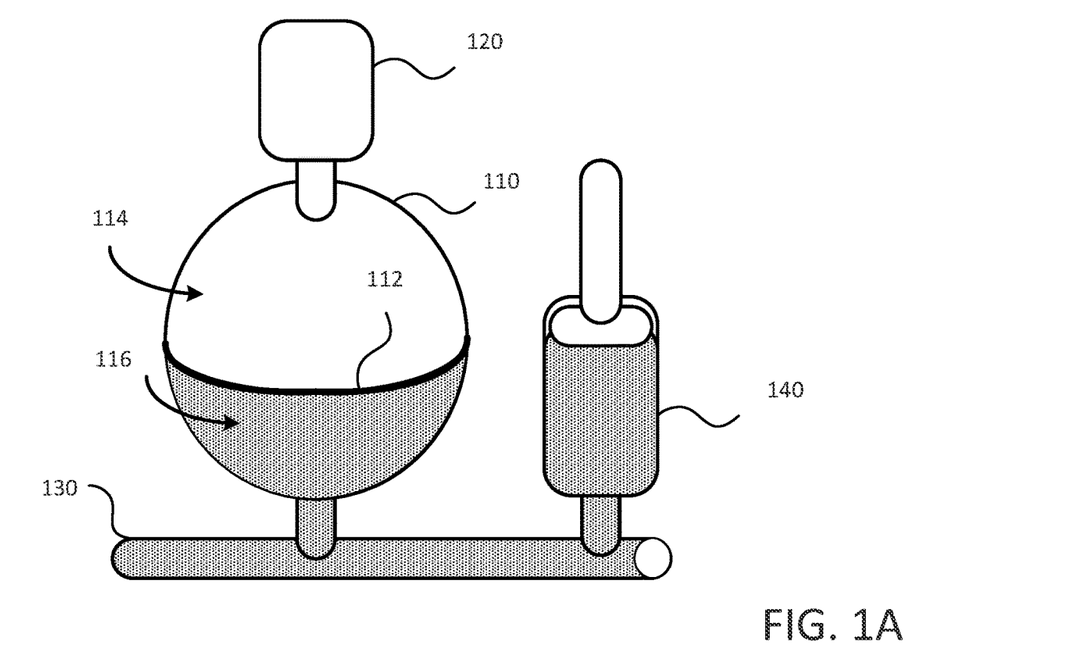
FIGS. 1A-1D illustrate a diaphragm-type hydraulic accumulator in a cross-sectional view in various stages of operation, according to aspects of the present disclosure.
Figure 1B:
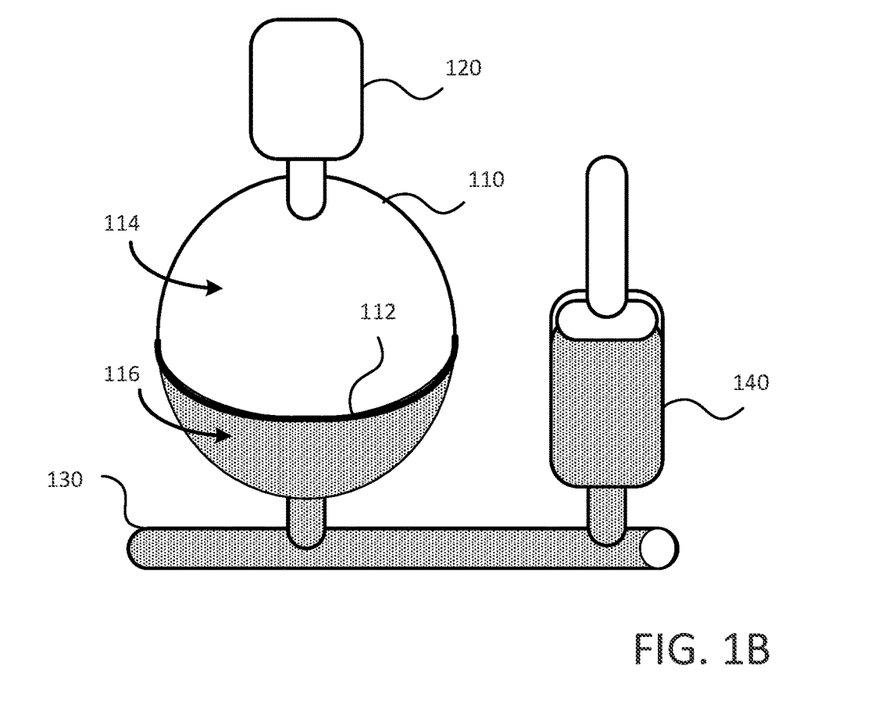

FIG. 1A illustrates a "fully charged" status of the hydraulic accumulator 110, such as after an operator has replaced and refilled the hydraulic system with new hydraulic fluid to a nominal level. As the hydraulic system loses hydraulic fluid over time, the operational status of the hydraulic accumulator 110 may progress to that illustrated in FIG. 1B. FIG. 1B illustrates a "reduced charge" status of the hydraulic accumulator 110 when less than the nominal level of hydraulic fluid is present in the system, but to gas has entered the second chamber 116. As will be appreciated, the level of hydraulic fluid in the hydraulic accumulator 110 may vary during operation of the hydraulic systems as forces are applied through the hydraulic fluid. Accordingly, the lower fluid level in FIG. 1B than in FIG. 1A may result in the first chamber 114 taking up a greater percentage of the hydraulic accumulator 110 when the pressure of the gas and the force applied to the hydraulic fluid remain the same.

Figure 1C:
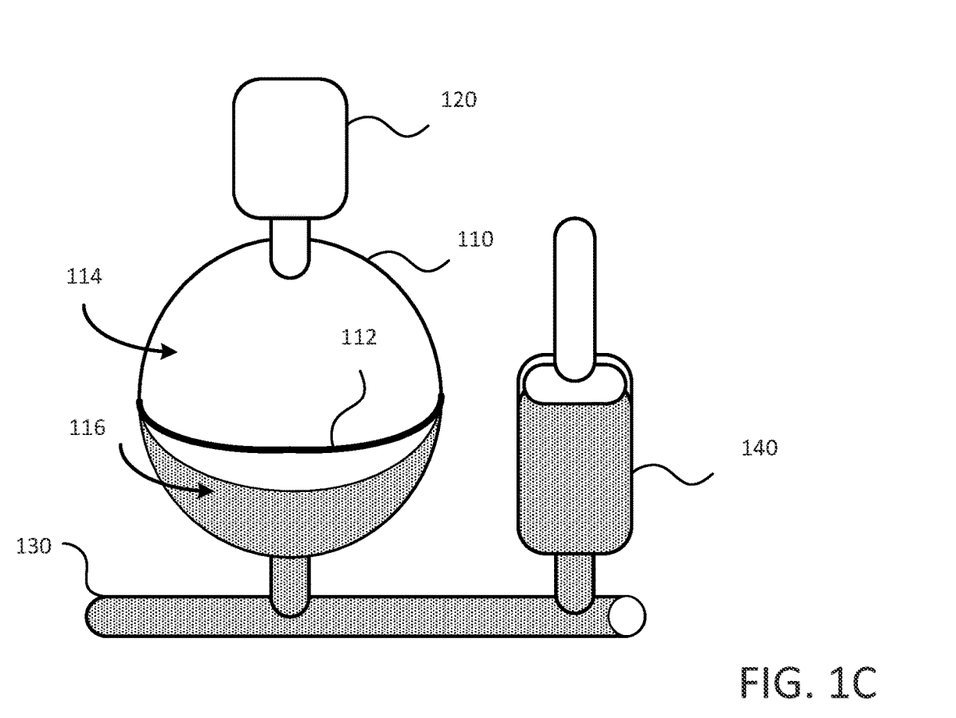

FIG. 1C illustrates a "gas ingress" status of the hydraulic accumulator 110 where some of the gas has permeated through the diaphragm 112 from the first chamber 114 and into the second chamber 116. In various aspects, the gas may diffuse into the hydraulic fluid, but is shown as a "bubble" or pocket of gas separated from the hydraulic fluid in FIGS. 1C and 1D. When the gas is present in the second chamber 116 (or in the supply line 130), the pressure of the diffused gas pushes against the gas still contained in the first chamber 114. The pressure of the diffused gas may make the fluid level of the hydraulic fluid higher appear than it actually is (e.g., raising a bobber, the diaphragm 112, or another fluid level sensor) and the presence of the compressible gas in the uncompressible hydraulic fluid, which may adversely affect how the hydraulic system operates.

Figure 1D:
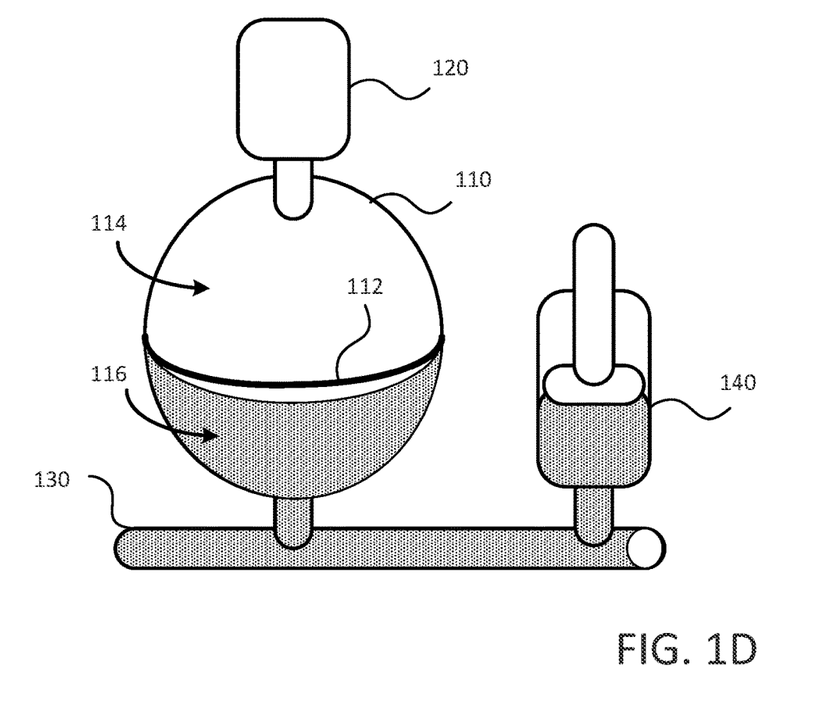

FIG. 1D illustrates "gas compression" status of the hydraulic accumulator 110 where the control or actuation surface 140 is at a different position than in FIG. 1C, but diffused gas is still present in the second chamber 116. In various aspects, the different position may be due to exerting a force on the hydraulic fluid (e.g., pushing downward on the surface 140) or no longer exerting a force via hydraulic fluid on the surface 140 via a different (not illustrated) element of the hydraulic system. Because the hydraulic fluid is incompressible, but the gas is compressible, the change in volume due to the change in position for the surface 140 affects the deflection of the diaphragm 112. This change in deflection not only affects the operation of the hydraulic system, but increases the difficulty in measuring the level of hydraulic fluid in the hydraulic system.

In various aspects, to remove the diffused gas, an operator empties the hydraulic system of the hydraulic fluid and refills the hydraulic system or bleeds off the gas trapped in the supply line 130 or hydraulic accumulator 110. Additionally or alternatively to removing the diffused gas, the operator can add hydraulic fluid to the hydraulic system to replace lost hydraulic fluid. Additionally, the operator may perform a search for a leakage source and replace or replace various elements (e.g., a diaphragm 112) through which the gas leaked. In various aspects, a hydraulic fluid reservoir may be included to add additional hydraulic fluid without needing the operator to drain the existing hydraulic fluid. The hydraulic fluid reservoir holds hydraulic fluid that is separated (e.g., via a valve) from the hydraulic fluid held in the supply line 130 and the hydraulic accumulator 110 until needed. In various aspects, a plunger can inject the reserved hydraulic fluid into circulation in the hydraulic system. However, knowing when gas ingress has occurred, and when to add fluid, remove gas, or recharge the hydraulic system has proven challenging in real world applications.

The approaches described in the present application therefore uses data analysis from the hydraulic system and the carrying system to improve the underlying systems reliability and accuracy to detect conditions leading up to gas ingress maintenance. By applying the herein described approaches, an operator can extend the life of the hydraulic system, improve the responsiveness of the hydraulic system (e.g., by removing compressible gas sooner), and improve the safety of the carrying system when using the hydraulic system, among other benefits.

Example Data Collection Considerations

Figure 2:
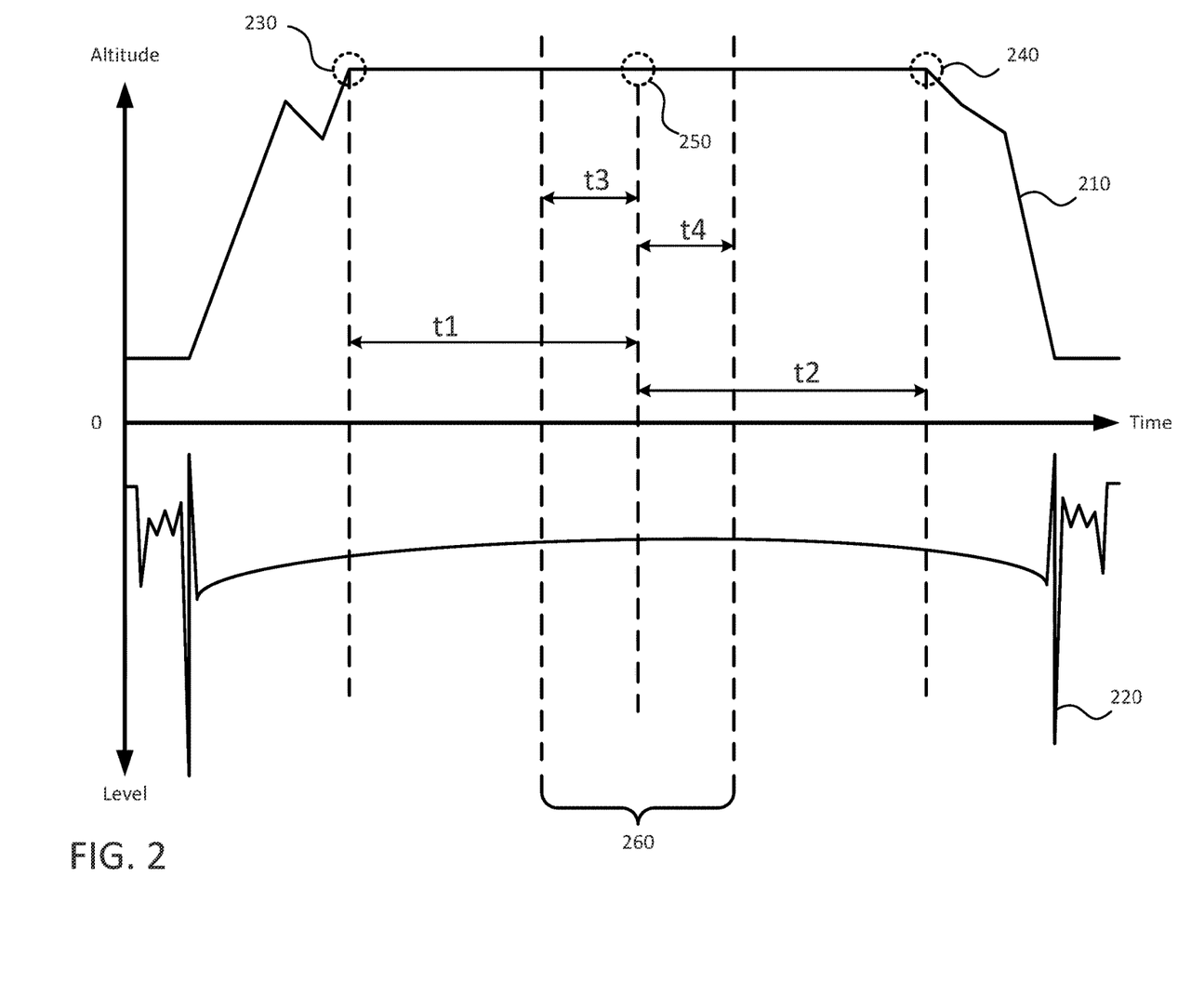
FIG. 2 illustrates an altitude path for an operational instance of an aircraft compared to hydraulic fluid level readings, according to aspects of the present disclosure.

FIG. 2 illustrates an altitude path 210 for an operational instance of an aircraft compared to hydraulic fluid level readings 220, according to aspects of the present disclosure. Because the hydraulic system in an aircraft is subject to use at takeoff and landing (e.g., deploying the landing gear), and the in-flight maneuvers of the aircraft can affect pressure in the hydraulic system (e.g., adjusting the stabilizers to maintain or adjust flight characteristics), and thereby affect the fluid level observed by various fluid level sensors, not every fluid level measurement taken may be reliable or steady/consistent compared to other sensors readings from the same carrying system.

The altitude path 210 is shown for one flight leg; from takeoff to landing. The fluid level readings 220 are shown on a corresponding time scale to the altitude path 210 and illustrate that the fluid level readings are highly variable during taxiing, takeoff, and landing flight segments when the various hydraulically controlled elements (e.g., landing gear, flaps, spoilers, etc.) are most often engaged. However, in the times between when the aircraft reaches Top of Climb (TOC) 230 and Top of Descent (TOD) 240, the aircraft is said to be in cruise.

A time for Middle of Cruise (MOC) 250 is defined between the TOC 230 and the TOD 240 (e.g., $t_1$ after TOC 230 and $t_2$ before TOD 240, where $t_1=t_2$), and represents a time when the hydraulically controlled elements are generally engaged minimally to maintain level flight. Stated differently, when in level flight, the hydraulic system is not engaged as often or as forcefully compared to other times during flight (e.g., takeoff and landing), and less variation in the hydraulic fluid level measurements are expected.

Although shown in FIG. 2 with an evenly spaced MOC 250 (e.g., where $t_1=t_2$), in various aspects, a MOC 250 or other measurement point can be specified unevenly (e.g., where $t_1/t_2$) between the start and end of steady operations for the carrying system. For example, a given aircraft may be known to experience turbulence along its route at a given time (e.g., when crossing a mountain range), and the MOC 250 can therefore be offset from the center of reaching TOC 230 and TOD 240 to account for the expected turbulent portion (e.g., when flaps may be engaged more frequently or forcefully). In some aspects, no stable cruise window is observable during the flight. In such a case, $t_1=t_{2=0}$, and TOC 230, TOD 240, and MOC 250 are at the same time for purposes of identification in the operational instance.

A stable reading window 260 is defined around the MOC 250 that corresponds to a time range when a large number of fluid level readings can be taken at different times with little expected variation among the readings. For example, a ten minute time window of $t_{3=5}$ minutes before the MOC 250 and $t_{4=5}$ minutes after the MOC 250 can include six hundred fluid level readings when one reading is taken every second. Although shown in FIG. 2 with an evenly spaced stable reading window 260 (e.g., where $t_3=t_4$), in various aspects, unequally spaced stable reading window 260 are also envisioned (e.g., where $t_3 \# t_4$).

In a general sense, the operator specifies the conditions to identify the beginning of steady operations (e.g., the TOC 230) and the end of steady operations (e.g., the TOD 240) for the carrying system for the hydraulic system, and a measurement point between those times is identified, around which a measurement window is defined. Sensor readings collected during the stable reading window 260 will exhibit some variation, but the operator can calculate the median value and the standard deviation among these fluid level readings to determine the usefulness of these data for detecting gas ingress. Any dataset with a standard deviation above a deviation threshold may be discarded and not used in future trend analyses as the standard deviation may indicate that the carrying system was not in a state of steady operations.

Example Methods of Operation

Figure 3:
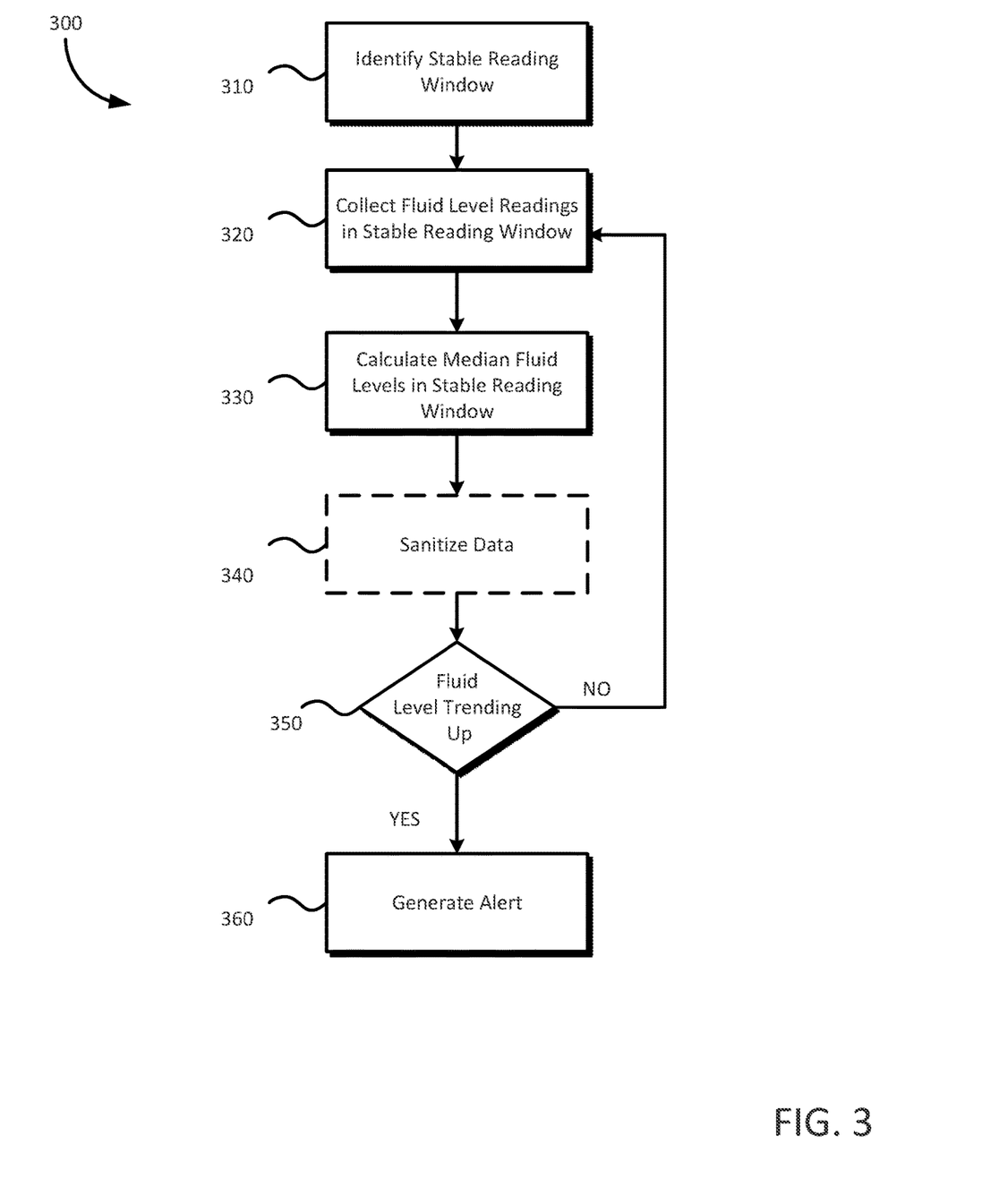
FIG. 3 is a flowchart of a method for prognosticating gas ingress, according to aspects of the present disclosure.

FIG. 3 is a flowchart of a method 300 for prognosticating gas ingress, according to aspects of the present disclosure. Method 300 begins at block 310, where an analysis system, such computing system 600 described in relation to FIG. 6, identifies a stable reading window 260. The analysis system identifies the beginning and end of stable operations of the carrying system, identifies a time in between these times, and defines the stable reading window 260 around the middle time (e.g., the MOC 250±X minutes).

At block 320, the analysis system collects a set of hydraulic system readings (e.g., pressure, fluid level) of the hydraulic fluid in the hydraulic system during the stable reading window 260. In various embodiments, a fluid sensor may be located in a hydraulic accumulator 110 or elsewhere in the hydraulic system and may include a bobber, a deflection sensor (associated with a diaphragm 112, plunger, or balloon dividing the first chamber 114 from the second chamber 116), a pressure sensor for the compressible gas, or the like. Several data readings are taken during the stable reading window 260 (e.g., every X milliseconds) to form a dataset of the hydraulic fluid level in the hydraulic system for a given operational instance of the carrying system.

At block 330, the analysis system calculates a median fluid level for the readings collected during the stable reading window 260.

At block 340, the analysis system optionally sanitizes the data. In various aspects, the analysis system may ignore certain data that are deemed not of interest, or that indicate that the values included in the data are unreliable for trend analysis. For example, a dataset with a median fluid level reading less than 100% of the nominal fill level may be ignored, as these data indicate the expected behavior over time of a hydraulic system (e.g., gradual loss of hydraulic fluid), and not gas ingress.

Additionally or alternatively, when the standard deviation for a given dataset collected from a stable reading window (260) is above a deviation threshold, the analysis system may ignore that dataset as it contains values collected when the hydraulic system was subjected to various forces that render the median fluid level readings less reliable for assessing the steady state of the hydraulic system. For example, the analysis system may ignore datasets with median fluid values below a nominal (e.g., 100%) or other threshold fill level for the hydraulic system. The analysis system therefore calculates a standard deviation in a set of fluid level readings and fits a regression model (e.g., a linear or polynomial regression) to the median fluid levels across a plurality of historically collected datasets. The analysis system uses the linear regression model to calculate a Mean Square Error (MSE) for the standard deviations, and can thereby exclude a given dataset during trend analysis when the MSE associated with the given operational instance is above an outlier threshold.

In some aspects, the analysis system uses other sensors in the carrying system (e.g., altitude sensors, actuation sensors for flaps or spoilers, flight or maintenance logs) that are unrelated to the hydraulic system to identify an operational aberration or other anomaly that indicates that the fluid level readings for a particular operation instance are atypical and should be ignored or excluded in future analyses, or to adjust operational values for control of the carrying system or hydraulic system based on known correlations. In some aspects, the dataset for the anomalous operational instance may be skipped over during future analysis or may bifurcate that analysis pool into datasets into a set of pre-aberration datasets and post-aberration datasets that are analyzed separately for trends indicative of gas ingress. For example, when flight logs indicate that an aircraft flew a second operational instance at a different altitude than a first or a third operational instance, the trend analysis may use data from the first and third operational instances for trend analysis, but exclude the data from the second operational instance from that same analysis. In another example, when maintenance logs indicate that a second operational instance occurred after a hydraulic fluid replacement operation, the analysis system may bifurcate the datasets so that any operational instances from before the second operational instance are not included in future trend analysis using the second or later operational instances (e.g., to establish a new baseline unrelated to previous data collected).

At block 350, the analysis system determines whether the fluid level readings are trending upward. For example, the fluid level readings may trend upward when gas ingress has occurred, despite the actual fluid level remaining constant or dropping over time. In response to identifying an increasing trend in the median fluid levels, method 300 proceeds to block 360. Otherwise, method 300 returns to block 320. As will be appreciated, a single reading does not indicate a trend. Accordingly, the analysis system may return to block 320 if less than a threshold number of readings have been collected in a sequence. For example, until the analysis system collects enough readings to establish a trend, the analysis system may forgo analyzing the sequential dataset for trends.

The analysis system analyzes several median fluid level readings collected over time as a time series data to identify whether the data exhibit an upward trend over time. For example, a first flight, a second flight, and a third flight can each provide one data point for the median fluid level. If the each of the flights is associated with a higher median fluid level than the previous flight, an increasing trend would exist in this example. In various aspects, the analysis system sets a trend threshold so that the increasing values are seen in at least X operational instances in a row before identifying a trend, or Y out of the X last observed operational instances of the carrying system (e.g., 3 out of 5, a majority of X, etc.) before detecting a trend.

In various aspects, analyzing the fluid level readings for trends indicative of gas ingress includes identifying a set of successive operational instances from a plurality of operational instances within an analysis window. For example, an analysis window may include the last X times an aircraft was flown, a dam lock was cycled, a crane extended a boom, etc.

In some aspects, an unsupervised machine learning technique may be used to by the analysis system in order to cluster the set of successive operational instances into a first cluster and a second cluster based on the associated median fluid levels and operational times (e.g., order in the time series) associated with the set of successive operational instances. From these clusters, the analysis system determines a distance between a first centroid value for the first cluster and a second centroid value for the second cluster. Using these distances, the analysis system can exclude the dataset for the latest operational instance of the set of successive operation instances from analysis in response to at least one of: a first sum of squared distances, between the first centroid value and each member of the first cluster, exceeding a sum squared error threshold; a second sum of squared distances, between the second centroid value and each member of the second cluster, exceeding the sum squared error threshold; or the distance between the first centroid value and the second centroid value exceeding a service specification distance (which indicates that the hydraulic fluid has being serviced (e.g., refilled) within the last X operation instances). Stated differently, the analysis system attempts to divide the data into pre-servicing and post-servicing classes of data, and when the classes/clusters are distinct, the analysis system can infer that a service event has occurred without having to access service logs or be manually told that a service event (e.g., refilling hydraulic fluid, bleeding off gas, etc.) has occurred. Instead, the analysis system can automatically identify a suspected service event and handle the time sequence data from various operational instances accordingly (e.g., not re-alerting after a service event, not using the service event as a sign of gas ingress, etc.).

At block 360, the analysis system generates an alert of gas ingress to the hydraulic system. In various aspects, the alert may be used to schedule future maintenance, change settings in an autopilot system (e.g., provided by a computing system 600 as discussed in greater detail in regard to FIG. 6) to account to the gas ingress until maintenance is performed on the hydraulic system, alert a human user, or inject additional hydraulic fluid into the hydraulic system (e.g., from a reservoir).

Figure 4:
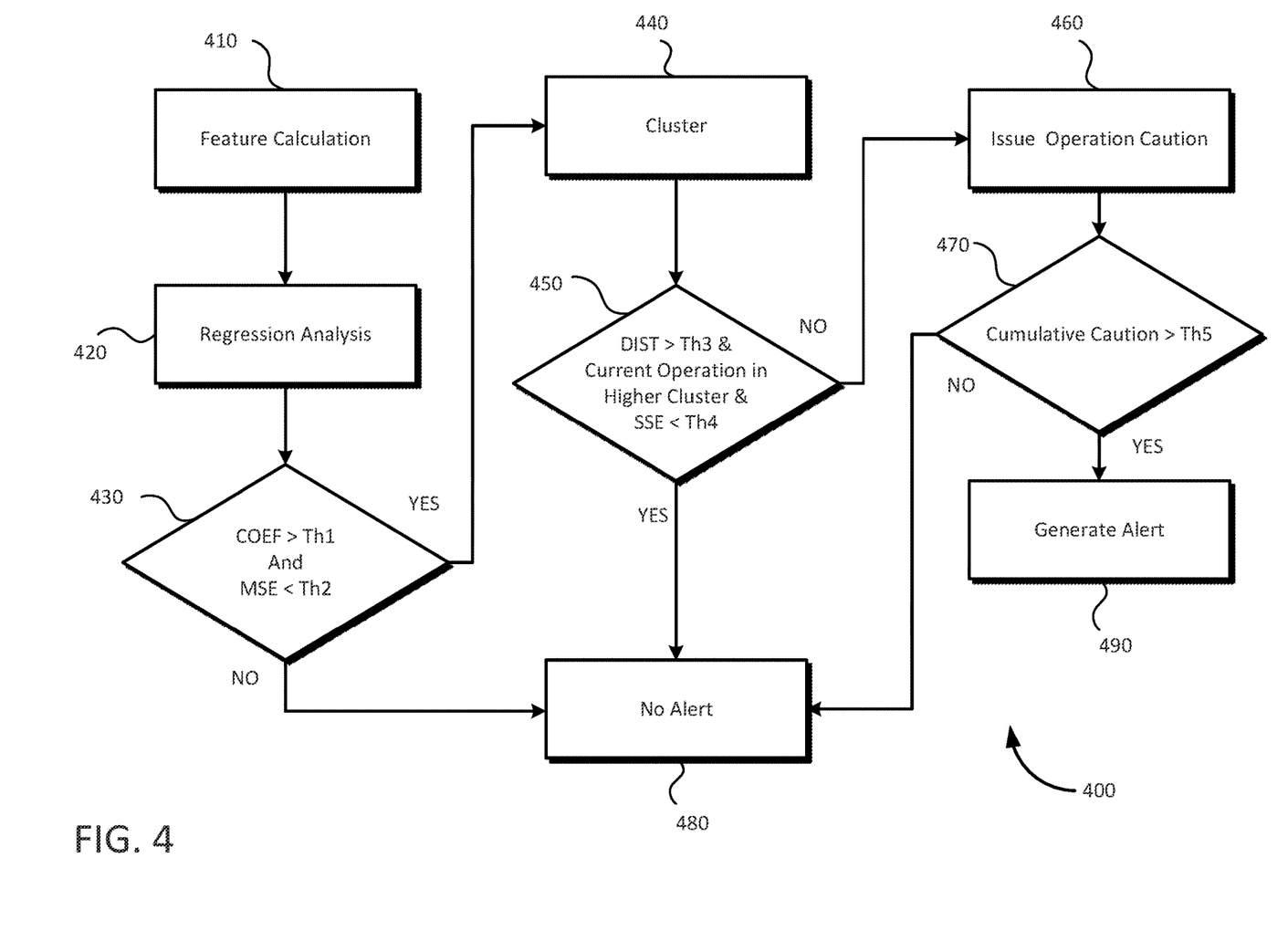
FIG. 4 is a flowchart of a method for performing calculations to prognosticate gas ingress, according to aspects of the present disclosure.

FIG. 4 is a flowchart of a method 400 for performing calculations to prognosticate gas ingress, according to aspects of the present disclosure. Although the blocks indicated in method 400 may be performed in various other orders from what is illustrated, the order of operations in method 400 indicate an effective mode of analysis for whether to generate an alert, which provides for faster computation of the determination (e.g., conserving computing resources by avoiding unnecessary computations) and more accurate results, than other modes or previous methods. Method 400 begins at block 410, where the analysis system performs feature calculation. During feature calculation, for each new operational instance, the analyses system retrieves the fluid level data from the last X operational instances of the carrying system, and calculates the median fluid level for each of the operational instances within a given time window.

At block 420, the analysis system performs a regression analysis on the datasets included in the analysis window. The analysis system therefore fits a regression model to the median fluid levels across a plurality of historically collected datasets. Additionally, the analysis system calculates a standard deviation in the set of fluid level readings. The analysis system uses the regression model to calculate the MSE for the standard deviations from the respective mean values modeled on the line/curve, to determine whether the given operational instances are outliers, and should therefore be ignored. The analysis system also calculates one or more slope coefficients (COEF) of the line/curve modeled during regression, to determine whether the fluid level is increasing (positive slope) or decreasing (negative slope), and at what rate the fluid level is changing (value of COEF).

At block 430, the analysis system determines whether both the COEF is above a first threshold and the MSE is below a second threshold for the analysis window.

At block 440, the analysis system clusters the operational instances (e.g., via KMeans) based on a distance (e.g., the Euclidean distance) of the combination of flight time (e.g., where in the sequence the associated operational instance is ordered) and hydraulic fluid quantity (e.g., the mean fluid level) as dimensions on which to cluster the various data points in a data space. The analysis system divides the data sets into two clusters, each of which has a centroid value for the hydraulic fluid level and the time of flight.

The analysis system calculates the distance (DISTHF) between the centroids of the two clusters based on the hydraulic fluid level value dimension (e.g., a Manhattan distance) but not the time value dimension. The analysis system then calculates and a Sum Squared Error (SSE) between the centroid of each cluster and each member of the respective cluster to determine whether the clustering has provided good or otherwise distinguishable results (e.g., with data points in the fluid level dimension that can be assigned to one, but not both of the clusters). If the current operational instance is located in the cluster associated with the lower hydraulic fluid level, the DISTHE is above a service specification threshold (e.g., indicating that the latest operational instance is too close to a service event to distinguish whether an upward trend is attributable to gas ingress versus and operator adding additional hydraulic fluid), or the SSE is above a confidence threshold, the analysis window may produce unreliable results, and is ignored.

Figure 5:
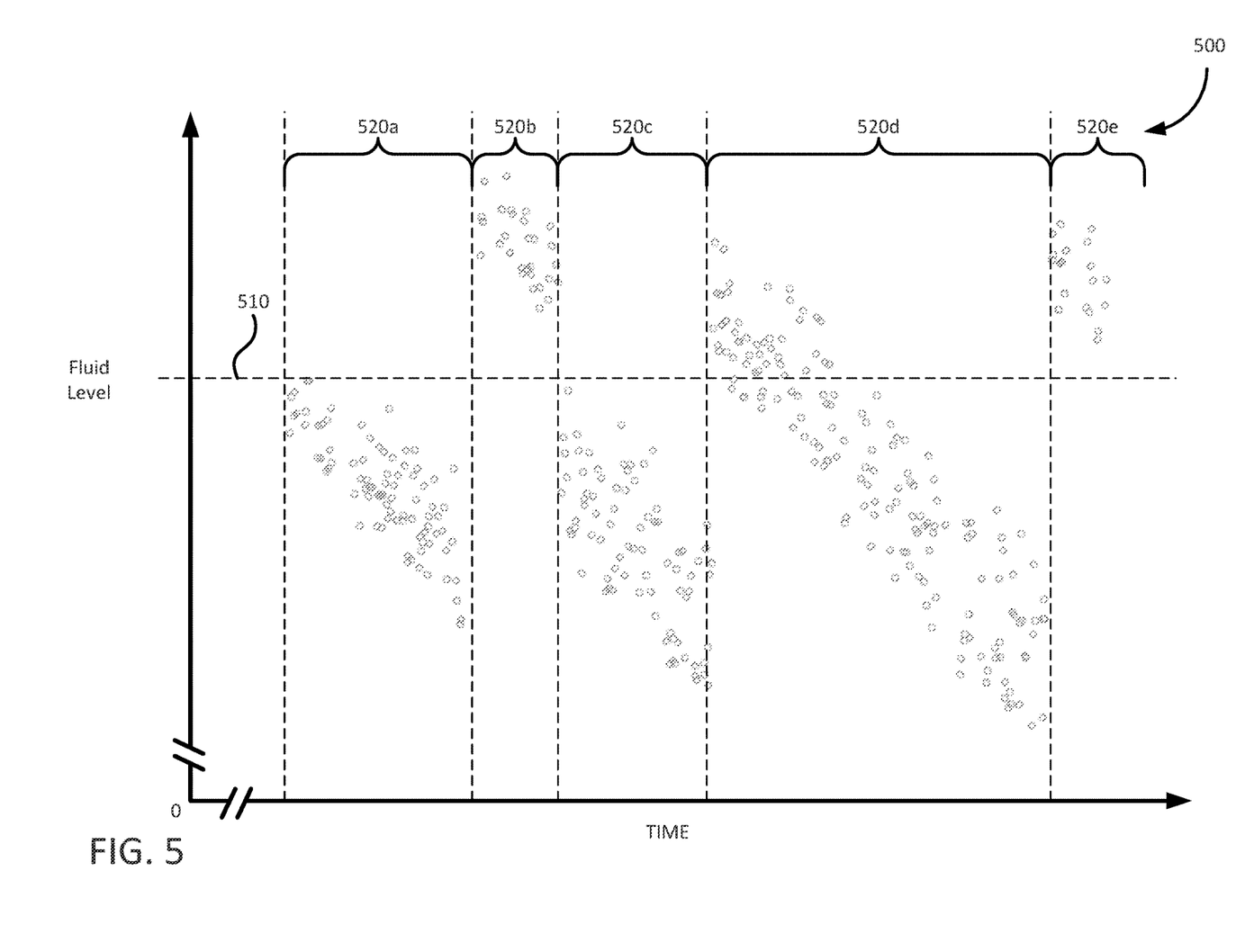
FIG. 5 illustrates a graph on which various fluid level readings are plotted over time, according to aspects of the present disclosure.

For example, FIG. 5 illustrates a graph 500 on which various fluid level readings are plotted over time, according to aspects of the present disclosure. The fluid level reading dimension is plotted on the Y-axis, with the nominal fluid level shown as line 510 for comparison, such that data points (shown as circles) above line 510 show above-nominal fluid level readings and data points below line 510 show below-nominal level readings. The time dimension is plotted on the X-axis, with earlier data points being presented leftward of later-collected data points. As will be seen in the data over time, the expected behavior is a gradual decrease in the fluid level, but the fluid level in the hydraulic system may "jump" due to a service event or appear to jump due to gas ingress into the hydraulic system.

Several time periods 520*a-e* (generally or collectively, time period 520) are shown in which the data, when clustered within the analysis windows, would result in indistinguishable clusters. However, when analyzed across time periods 520, the analysis would result in distinguishable clusters. For example, the divisions between each of the time periods may represent a gas ingress event (e.g., from the first time period 520*a* to the second time period 520*b*) or a service event, when an operator has removed gas from the hydraulic system and refilled the hydraulic fluid level to a nominal state (e.g., from the second time period 520*b* to the third time period 520*c*). Accordingly, the analysis system can identify these jumps in hydraulic fluid level via clustering, so that post-jump values can be identified as a potential gas ingress event to alert a user to or a service event to avoid generating a false positive alert to based on additional features of the data, such as those discussed in relation to block 450 of method 400 discussed in FIG. 4.

Returning to FIG. 4, at block 450, the analysis system determines whether all of the DISTHE is above a third threshold, the current operational instance is located in the higher cluster, and the SSE is less than a fourth threshold hold true, indicating that the data are reliable to indicate whether gas ingress has been detected. In various aspects, the third threshold is satisfied with DISTHE values of 15% or higher, and the fourth threshold is satisfied with SSE values of 120 or lower. Method 400 proceeds to block 460 when these conditions are all false, and proceeds to block 480 when at least one condition is true.

At block 460, the analysis system issues a single operation caution. An operation caution indicates that for the latest operational instance in the analysis window, gas ingress is suspected in the hydraulic system. However, because the analysis system uses trends and not individual data points when determining whether to generate an alert, and a single operational caution may be an anomaly. Accordingly, to avoid generating alerts based on false positive determining of gas ingress, method 400 proceeds to determine whether enough operation cautions have been issued in the last X operational instances to warrant generating an alert at the present time. In various aspects, the operational cautions, unlike alerts, are not issued to the carrying system or provided to users as the individual analysis results that result in operational cautions may be subject to statistical errors or anomalies. Instead, the operational cautions serve as a record keeping device so that, for example, when three of the last five operational instances are associated with operational cautions, the system can be confident that gas ingress has occurred and therefore be generated that is shared with a user or the carrying system to take action on.

At block 470, the analysis system determines whether the cumulative single operation cautions are greater than a fifth threshold. For example, after the analyses system issues a single operation caution for a fifth operational instance, but no operational cautions were issued for the first through fourth operational instances, the analysis system may determine to not generate an alert because the caution issued for the fifth operational instance may be a false positive for gas ingress. Accordingly, the fifth threshold may specify that at least Y out of the past X operational instances should be associated with operation cautions before an alert should be generated. For example, when at least three of the last five operational instances resulted in operation cautions, the fifth threshold is satisfied. When the fifth threshold is satisfied, method 400 proceeds to block 490. Otherwise, method 400 proceed to block 480.

At block 480, the analysis system concludes the given instance of method 400 without generating an alert.

At block 490, the analysis system generates an alert for the latest operational instance. In various aspects, the alert may be used to schedule future maintenance, change settings in an autopilot system (e.g., provided by a computing system 600 as discussed in greater detail in regard to FIG. 6) to account to the gas ingress until maintenance is performed on the hydraulic system, alert a human user, or inject additional hydraulic fluid into the hydraulic system (e.g., from a reservoir), Method 400 may then conclude.

Example Processing System and Controller

Figure 6:
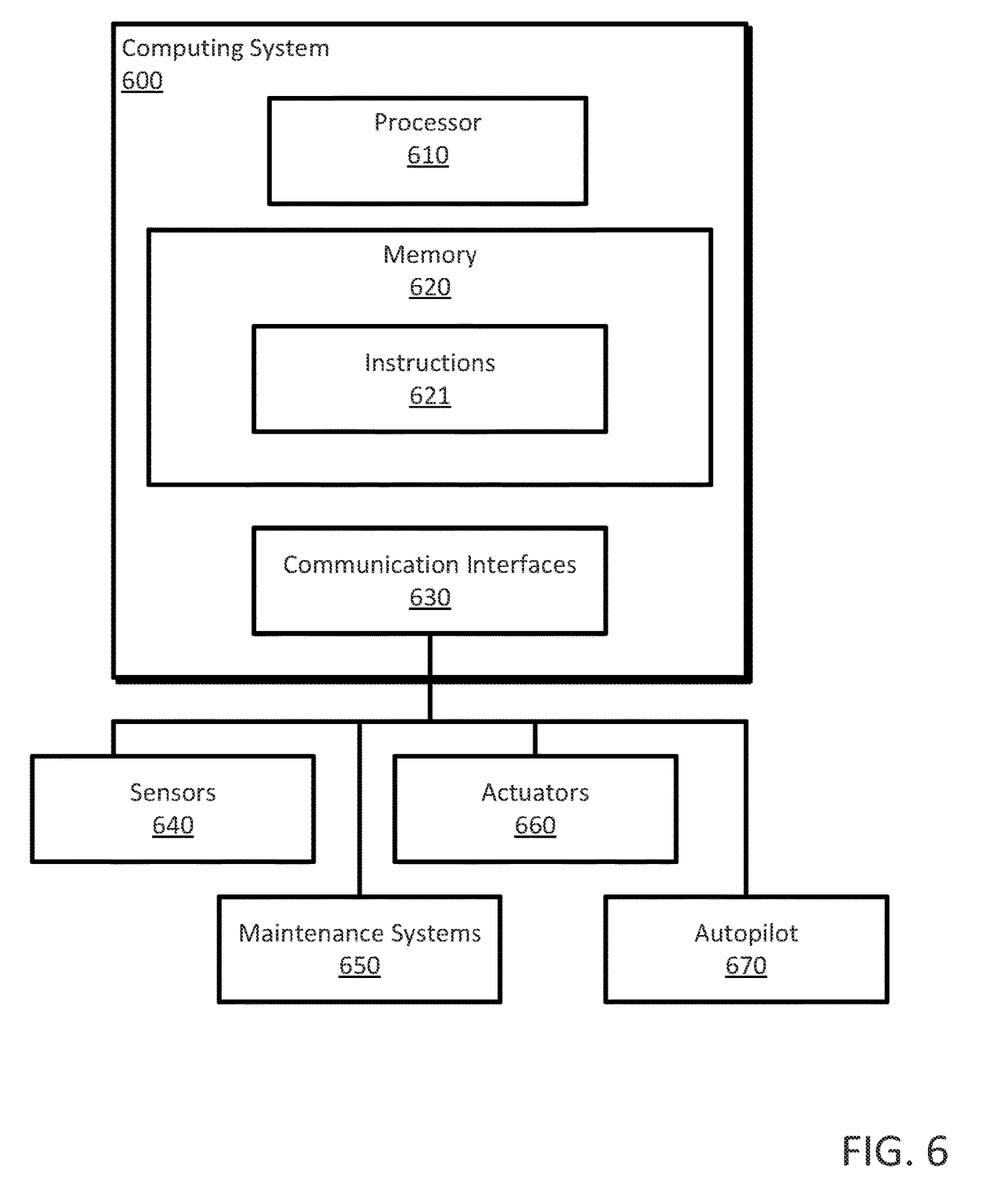
FIG. 6 depicts a computing device, according to aspects of the present disclosure.

FIG. 6 depicts a schematic view of a computing system 600 that can be used according to the systems and methods described herein. The computing system 600 includes a processor 610 (e.g., a central processing unit (CPU)) in data communication with a memory 620, and a communication interface 630. Although described separately, it is to be appreciated that functional blocks described with respect to the computing system 600 need not be separate structural elements. For example, the processor 610 and memory 620 can be embodied in a single chip. The processor 610 can be a general purpose processor, a Graphics Processing Unit (GPU), a Tensor Processing Unit (TPU) a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor 610 may also be implemented as a combination of computing devices, e.g., a combination of a DSP and a microprocessor, a plurality of microprocessors, one or more microprocessors in conjunction with a DSP core, or any other such configuration.

The processor 610 can be coupled, via one or more buses, to read information from or write information to memory 620. The processor may additionally, or in the alternative, contain memory, such as processor registers. The memory 620 can include processor cache, including a multi-level hierarchical cache in which different levels have different capacities and access speeds. The memory 620 can also include random access memory (RAM), other volatile storage devices, or non-volatile storage devices. The storage can include hard drives, flash memory, etc. Memory 620 can also include a computer program product embodied on memory 620 comprising code to perform the methods described herein via code or instructions 621 that can be executed by the processor 610. In various instances, the memory 620 is referred to as a computer-readable storage medium or a non-transitory computer-readable medium. The computer-readable storage medium is a non-transitory device capable of storing information and is distinguishable from computer-readable transmission media such as electronic transitory signals capable of carrying information from one location to another.

The processor 610 also may be coupled to communication interface 630 for receiving input from and providing output to the computing system 600. These inputs and outputs may include data from various sensors 640 and maintenance systems 650, and control signals to various actuators 660 or set points and alerts to the autopilot 670 or control panel of a carrying system (such as an aircraft) within the system and alerts or messages to various external devices.

Aspects of the present disclosure have been described above with reference to specific embodiments. Persons skilled in the art, however, will understand that various modifications and changes may be made thereto without departing from the broader spirit and scope of the present disclosure as set forth in the appended claims. The foregoing description and drawings are, accordingly, to be regarded in an illustrative rather than a restrictive sense.

Example Clauses

Implementation examples are described in the following numbered clauses:

Clause 1: A method, comprising: identifying a stable reading window when operating a carrying system comprising a hydraulic system; collecting a set of fluid level readings of a hydraulic fluid in the hydraulic system during a plurality of stable reading windows across a corresponding plurality of operational instances of the carrying system; calculating median fluid levels in each stable reading window of the plurality of stable reading windows; identifying an increasing trend in the median fluid levels when analyzed as time series data that satisfies a trend threshold of at least a predefined number successive indications of increased fluid levels in the hydraulic fluid within an analysis window; and generating an alert of gas ingress to the hydraulic system.

Clause 2: A method as described in one or more of clauses 1 and 3-7, further comprising: calculating standard deviations in the set of fluid level readings for each stable reading window of the plurality of stable reading windows; fitting a regression model to the median fluid levels as the time series data; calculating a mean square error for the standard deviations; and excluding a given instance of the median fluid levels when analyzing the time series data when the mean square error associated with the given instance is above an outlier threshold.

Clause 3: A method as described in one or more of clauses 1, 2, and 4-7, wherein: the carrying system is an aircraft; the stable reading window occurs a first threshold number of minutes before a middle of cruise time and the first threshold number of minutes after the middle of cruise time; and the middle of cruise time occurs at least a second threshold number of minutes after reaching a top of climb and at least the second threshold number of minutes before reaching a top of descent during a given operational instance of the carrying system.

Clause 4: A method as described in one or more of clauses 1-3 and 4-7, further comprising: identifying a given operational instance of the plurality of operational instances in which sensors in the carrying system unrelated to the hydraulic system indicate an operational aberration; excluding a given instance of the median fluid levels associated with the given operational instance when analyzing the time series data; and bifurcating the time series data to represent operational instances before the operational aberration and operational instances after the operational aberration.

Clause 5: A method as described in one or more of clauses 1-4, 6, and 7, wherein analyzing the median fluid levels as the time series data further comprises: identifying a set of successive operational instances from the plurality of operational instances; clustering, via an unsupervised machine learning technique, the set of successive operational instances into a first cluster and a second cluster based on associated median fluid levels associated with the set of successive operational instances and associated operational times associated with the set of successive operational instances; determining a distance between a first centroid value for the first cluster and a second centroid value for the second cluster based on the associated median fluid levels; and excluding a latest operational instance of the set of successive operation instances from analysis in response to at least one of: a first sum of squared distances, between the first centroid value and each member of the first cluster exceeding, a sum squared error threshold; a second sum of squared distances, between the second centroid value and each member of the second cluster, exceeding the sum squared error threshold; and the distance between the first centroid value and the second centroid value exceeds a service specification indicative of the hydraulic fluid being serviced within the set of successive operation instances.

Clause 6: A method as described in one or more of clauses 1-5 and 7, wherein generating the alert of gas ingress to the hydraulic system further comprises: identifying that the increasing trend holds true for a majority of the predefined number successive indications of the increased fluid levels in the hydraulic fluid.

Clause 7: A method as described in one or more of clauses 1-6, wherein generating the alert of gas ingress to the hydraulic system further comprises: identifying that the increased fluid levels in the hydraulic fluid comprise at least a threshold amount over a nominal fill level for the hydraulic fluid.

Clause 8: A system, comprising: a processor; and a memory, including instructions that when executed by the processor perform operations comprising: identifying a stable reading window when operating a carrying system comprising a hydraulic system; collecting a set of fluid level readings of a hydraulic fluid in the hydraulic system during a plurality of stable reading windows across a corresponding plurality of operational instances of the carrying system; calculating median fluid levels in each stable reading window of the plurality of stable reading windows; identifying an increasing trend in the median fluid levels when analyzed as time series data that satisfies a trend threshold of at least a predefined number successive indications of increased fluid levels in the hydraulic fluid within an analysis window; and generating an alert of gas ingress to the hydraulic system.

Clause 9: A system of as described in one or more of clauses 8 and 10-14, wherein the operations further comprise: calculating standard deviations in the set of fluid level readings for each stable reading window of the plurality of stable reading windows; fitting a regression model to the median fluid levels as the time series data; calculating a mean square error for the standard deviations; and excluding a given instance of the median fluid levels when analyzing the time series data when the mean square error associated with the given instance is above an outlier threshold.

Clause 10: A system of as described in one or more of clauses 8, 9, and 11-14, wherein: the carrying system is an aircraft; the stable reading window occurs a first threshold number of minutes before a middle of cruise time and the first threshold number of minutes after the middle of cruise time; and the middle of cruise time occurs at least a second threshold number of minutes after reaching a top of climb and at least the second threshold number of minutes before reaching a top of descent during a given operational instance of the carrying system.

Clause 11: A system of as described in one or more of clauses 8-10 and 12-14, wherein the operations further comprise: identifying a given operational instance of the plurality of operational instances in which sensors in the carrying system unrelated to the hydraulic system indicate an operational aberration; excluding a given instance of the median fluid levels associated with the given operational instance when analyzing the time series data; and bifurcating the time series data to represent operational instances before the operational aberration and operational instances after the operational aberration.

Clause 12: A system of as described in one or more of clauses 8-11, 13, and 14, wherein analyzing the median fluid levels as the time series data further comprises: identifying a set of successive operational instances from the plurality of operational instances; clustering, via an unsupervised machine learning technique, the set of successive operational instances into a first cluster and a second cluster based on associated median fluid levels associated with the set of successive operational instances and associated operational times associated with the set of successive operational instances; determining a distance between a first centroid value for the first cluster and a second centroid value for the second cluster based on the associated median fluid levels; and excluding a latest operational instance of the set of successive operation instances from analysis in response to at least one of: a first sum of squared distances, between the first centroid value and each member of the first cluster exceeding, a sum squared error threshold; a second sum of squared distances, between the second centroid value and each member of the second cluster, exceeding the sum squared error threshold; and the distance between the first centroid value and the second centroid value exceeds a service specification indicative of the hydraulic fluid being serviced within the set of successive operation instances.

Clause 13: A system of as described in one or more of clauses 8-12 and 14, wherein generating the alert of gas ingress to the hydraulic system further comprises: identifying that the increasing trend holds true for a majority of the predefined number successive indications of the increased fluid levels in the hydraulic fluid.

Clause 14: A system of as described in one or more of clauses 8-13, wherein generating the alert of gas ingress to the hydraulic system further comprises: identifying that the increased fluid levels in the hydraulic fluid comprise at least a threshold amount over a nominal fill level for the hydraulic fluid.

Clause 15: A memory device including instructions that when executed by a processor perform operations comprising: identifying a stable reading window when operating a carrying system comprising a hydraulic system; collecting a set of fluid level readings of a hydraulic fluid in the hydraulic system during a plurality of stable reading windows across a corresponding plurality of operational instances of the carrying system; calculating median fluid levels in each stable reading window of the plurality of stable reading windows; identifying an increasing trend in the median fluid levels when analyzed as time series data that satisfies a trend threshold of at least a predefined number successive indications of increased fluid levels in the hydraulic fluid within an analysis window; and generating an alert of gas ingress to the hydraulic system.

Clause 16: A memory device of as described in one or more of clauses 15 and 17-20, wherein the operations further comprise: calculating standard deviations in the set of fluid level readings for each stable reading window of the plurality of stable reading windows; fitting a regression model to the median fluid levels as the time series data; calculating a mean square error for the standard deviations; and excluding a given instance of the median fluid levels when analyzing the time series data when the mean square error associated with the given instance is above an outlier threshold.

Clause 17: A memory device of as described in one or more of clauses 15, 16, and 18-20, wherein: the carrying system is an aircraft; the stable reading window occurs a first threshold number of minutes before a middle of cruise time and the first threshold number of minutes after the middle of cruise time; and the middle of cruise time occurs at least a second threshold number of minutes after reaching a top of climb and at least the second threshold number of minutes before reaching a top of descent during a given operational instance of the carrying system.

Clause 18: A memory device of as described in one or more of clauses 15-17, 19, and 20, further comprising: identifying a given operational instance of the plurality of operational instances in which sensors in the carrying system unrelated to the hydraulic system indicate an operational aberration; excluding a given instance of the median fluid levels associated with the given operational instance when analyzing the time series data; and bifurcating the time series data to represent operational instances before the operational aberration and operational instances after the operational aberration.

Clause 19: A memory device of as described in one or more of clauses 15-18 and 20, wherein generating the alert of gas ingress to the hydraulic system further comprises: identifying that the increasing trend holds true for a majority of the predefined number successive indications of the increased fluid levels in the hydraulic fluid.

Clause 20: A memory device of as described in one or more of clauses 15-19, wherein generating the alert of gas ingress to the hydraulic system further comprises: identifying that the increased fluid levels in the hydraulic fluid comprise at least a threshold amount over a nominal fill level for the hydraulic fluid.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
identifying a stable reading window when operating a carrying system comprising a hydraulic system;
collecting a set of fluid level readings of a hydraulic fluid in the hydraulic system during a plurality of stable reading windows across a corresponding plurality of operational instances of the carrying system;
calculating median fluid levels in each stable reading window of the plurality of stable reading windows;
identifying an increasing trend in the median fluid levels when analyzed as time series data that satisfies a trend threshold of at least a predefined number of successive indications of increased fluid levels in the hydraulic fluid within an analysis window; and
generating an alert of gas ingress to the hydraulic system,
wherein the alert causes injection of additional hydraulic fluid into the hydraulic system, and
wherein generating the alert of gas ingress to the hydraulic system comprises identifying that the increasing trend holds true for a majority of the predefined number of successive indications of the increased fluid levels in the hydraulic fluid.

2. The method of claim 1, further comprising:
calculating standard deviations in the set of fluid level readings for each stable reading window of the plurality of stable reading windows;
fitting a regression model to the median fluid levels as the time series data;
calculating a mean square error for the standard deviations; and
excluding a given instance of the median fluid levels when analyzing the time series data when the mean square error associated with the given instance is above an outlier threshold.

3. The method of claim 1, wherein:
the carrying system is an aircraft;
the stable reading window occurs a first threshold number of minutes before a middle of cruise time and the first threshold number of minutes after the middle of cruise time; and
the middle of cruise time occurs at least a second threshold number of minutes after reaching a top of climb and at least the second threshold number of minutes before reaching a top of descent during a given operational instance of the carrying system.

4. The method of claim 1, further comprising:
identifying a given operational instance of the corresponding plurality of operational instances in which sensors in the carrying system unrelated to the hydraulic system indicate an operational aberration;
excluding a given instance of the median fluid levels associated with the given operational instance when analyzing the time series data; and
bifurcating the time series data to represent operational instances before the operational aberration and operational instances after the operational aberration.

5. The method of claim 1, wherein analyzing the median fluid levels as the time series data further comprises:
identifying a set of successive operational instances from the corresponding plurality of operational instances;
clustering, via an unsupervised machine learning technique, the set of successive operational instances into a first cluster and a second cluster based on associated median fluid levels associated with the set of successive operational instances and associated operational times associated with the set of successive operational instances;
determining a distance between a first centroid value for the first cluster and a second centroid value for the second cluster based on the associated median fluid levels; and
excluding a latest operational instance of the set of successive operational instances from analysis in response to at least one of:
a first sum of squared distances, between the first centroid value and each member of the first cluster exceeding, a sum squared error threshold;
a second sum of squared distances, between the second centroid value and each member of the second cluster, exceeding the sum squared error threshold; and
the distance between the first centroid value and the second centroid value exceeds a service specification indicative of the hydraulic fluid being serviced within the set of successive operational instances.

6. The method of claim 1, wherein generating the alert of gas ingress to the hydraulic system further comprises:
identifying that the increased fluid levels in the hydraulic fluid comprise at least a threshold amount over a nominal fill level for the hydraulic fluid.

7. The method of claim 1, wherein the carrying system is a vehicle associated with at least one of:
a watercraft,
a submersible,
an aircraft,
a spacecraft,
a dirigible,
an automobile,
a train, or
an autonomous vehicle.

8. A system, comprising:
a processor; and
a memory, including instructions that when executed by the processor perform operations comprising:
identifying a stable reading window when operating a carrying system comprising a hydraulic system;
collecting a set of fluid level readings of a hydraulic fluid in the hydraulic system during a plurality of stable reading windows across a corresponding plurality of operational instances of the carrying system;
calculating median fluid levels in each stable reading window of the plurality of stable reading windows;
identifying an increasing trend in the median fluid levels when analyzed as time series data that satisfies a trend threshold of at least a predefined number of successive indications of increased fluid levels in the hydraulic fluid within an analysis window; and generating an alert of gas ingress to the hydraulic system,
wherein the alert causes injection of additional hydraulic fluid into the hydraulic system, and
wherein generating the alert of gas ingress to the hydraulic system comprises identifying that the increasing trend holds true for a majority of the predefined number of successive indications of the increased fluid levels in the hydraulic fluid.

9. The system of claim 8, wherein the operations further comprise:
calculating standard deviations in the set of fluid level readings for each stable reading window of the plurality of stable reading windows;
fitting a regression model to the median fluid levels as the time series data;
calculating a mean square error for the standard deviations; and
excluding a given instance of the median fluid levels when analyzing the time series data when the mean square error associated with the given instance is above an outlier threshold.

10. The system of claim 8, wherein:
the carrying system is an aircraft;
the stable reading window occurs a first threshold number of minutes before a middle of cruise time and the first threshold number of minutes after the middle of cruise time; and
the middle of cruise time occurs at least a second threshold number of minutes after reaching a top of climb and at least the second threshold number of minutes before reaching a top of descent during a given operational instance of the carrying system.

11. The system of claim 8, wherein the operations further comprise:
identifying a given operational instance of the corresponding plurality of operational instances in which sensors in the carrying system unrelated to the hydraulic system indicate an operational aberration;
excluding a given instance of the median fluid levels associated with the given operational instance when analyzing the time series data; and
bifurcating the time series data to represent operational instances before the operational aberration and operational instances after the operational aberration.

12. The system of claim 8, wherein analyzing the median fluid levels as the time series data further comprises:
identifying a set of successive operational instances from the corresponding plurality of operational instances;
clustering, via an unsupervised machine learning technique, the set of successive operational instances into a first cluster and a second cluster based on associated median fluid levels associated with the set of successive operational instances and associated operational times associated with the set of successive operational instances;
determining a distance between a first centroid value for the first cluster and a second centroid value for the second cluster based on the associated median fluid levels; and
excluding a latest operational instance of the set of successive operational instances from analysis in response to at least one of:
a first sum of squared distances, between the first centroid value and each member of the first cluster exceeding, a sum squared error threshold;
a second sum of squared distances, between the second centroid value and each member of the second cluster, exceeding the sum squared error threshold; and
the distance between the first centroid value and the second centroid value exceeds a service specification indicative of the hydraulic fluid being serviced within the set of successive operational instances.

13. The system of claim 8, wherein generating the alert of gas ingress to the hydraulic system further comprises:
identifying that the increased fluid levels in the hydraulic fluid comprise at least a threshold amount over a nominal fill level for the hydraulic fluid.

14. A memory device including instructions that when executed by a processor perform operations comprising:
identifying a stable reading window when operating a carrying system comprising a hydraulic system;
collecting a set of fluid level readings of a hydraulic fluid in the hydraulic system during a plurality of stable reading windows across a corresponding plurality of operational instances of the carrying system;
calculating median fluid levels in each stable reading window of the plurality of stable reading windows;
identifying an increasing trend in the median fluid levels when analyzed as time series data that satisfies a trend threshold of at least a predefined number of successive indications of increased fluid levels in the hydraulic fluid within an analysis window; and
generating an alert of gas ingress to the hydraulic system, wherein the alert causes injection of additional hydraulic fluid into the hydraulic system, and
wherein generating the alert of gas ingress to the hydraulic system comprises identifying that the increasing trend holds true for a majority of the predefined number of successive indications of the increased fluid levels in the hydraulic fluid.

15. The memory device of claim 14, wherein the operations further comprise:
calculating standard deviations in the set of fluid level readings for each stable reading window of the plurality of stable reading windows;
fitting a regression model to the median fluid levels as the time series data;
calculating a mean square error for the standard deviations; and
excluding a given instance of the median fluid levels when analyzing the time series data when the mean square error associated with the given instance is above an outlier threshold.

16. The memory device of claim 14, wherein:
the carrying system is an aircraft;
the stable reading window occurs a first threshold number of minutes before a middle of cruise time and the first threshold number of minutes after the middle of cruise time; and
the middle of cruise time occurs at least a second threshold number of minutes after reaching a top of climb and at least the second threshold number of minutes before reaching a top of descent during a given operational instance of the carrying system.

17. The memory device of claim 14, further comprising:
identifying a given operational instance of the corresponding plurality of operational instances in which sensors in the carrying system unrelated to the hydraulic system indicate an operational aberration;
excluding a given instance of the median fluid levels associated with the given operational instance when analyzing the time series data; and
bifurcating the time series data to represent operational instances before the operational aberration and operational instances after the operational aberration.

18. The memory device of claim 14, wherein generating the alert of gas ingress to the hydraulic system further comprises:
identifying that the increased fluid levels in the hydraulic fluid comprise at least a threshold amount over a nominal fill level for the hydraulic fluid.

19. The memory device of claim 14, wherein the carrying system is associated with a land-based system included in a structure related to at least a dam lock.

20. The memory device of claim 14, wherein the carrying system is a vehicle associated with at least one of:
- a watercraft,
- a submersible,
- an aircraft,
- a spacecraft,
- a dirigible,
- an automobile,
- a train, or
- an autonomous vehicle.

\* \* \* \* \*